(12) United States Patent
Fledersbacher et al.

(10) Patent No.: US 7,870,731 B2
(45) Date of Patent: Jan. 18, 2011

(54) EXHAUST GAS TURBOCHARGER FOR AN INTERNAL COMBUSTION ENGINE

(75) Inventors: Peter Fledersbacher, Stuttgart (DE); Torsten Hirth, Rutesheim (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 596 days.

(21) Appl. No.: 11/978,158

(22) Filed: Oct. 27, 2007

(65) Prior Publication Data
US 2008/0092538 A1 Apr. 24, 2008

Related U.S. Application Data

(63) Continuation-in-part of application No. PCT/EP2006/003560, filed on Apr. 19, 2006.

(30) Foreign Application Priority Data

Apr. 29, 2005 (DE) .................... 10 2005 019 938

(51) Int. Cl.
*F02B 33/44* (2006.01)
*F04D 29/42* (2006.01)
*F04D 29/66* (2006.01)
*F04D 29/40* (2006.01)
*F04D 29/38* (2006.01)

(52) U.S. Cl. .................. 60/605.1; 60/602; 415/119; 415/58.6; 416/183; 416/203

(58) Field of Classification Search ............... 60/605.1, 60/602; 415/114–115, 58.6, 77, 206; 416/183, 416/223 R, 203, 198 R, 189
See application file for complete search history.

(56) References Cited

U.S. PATENT DOCUMENTS

| | | | | |
|---|---|---|---|---|
| 2,469,125 A | * | 5/1949 | Meisser | 416/183 |
| 2,827,261 A | | 3/1958 | Parker et al. | 415/77 |
| 3,481,531 A | * | 12/1969 | MacArthur et al. | 416/203 |
| 3,904,308 A | * | 9/1975 | Ribaud | 416/183 |
| 4,502,837 A | * | 3/1985 | Blair et al. | 416/183 |
| 5,105,616 A | | 4/1992 | Bornemisza | 60/804 |
| 5,213,473 A | * | 5/1993 | Fiala | 416/183 |
| 5,375,974 A | * | 12/1994 | Heinrich | 415/119 |
| 5,403,149 A | * | 4/1995 | Arnet et al. | 415/58.6 |
| 6,578,351 B1 | * | 6/2003 | Modafferi | 415/144 |
| 6,634,174 B2 | * | 10/2003 | Sumser et al. | 60/602 |
| 7,412,830 B2 | * | 8/2008 | Sumser | 60/605.1 |

(Continued)

FOREIGN PATENT DOCUMENTS

DE 3908285 C1 * 6/1990

(Continued)

*Primary Examiner*—Thai Ba Trieu
(74) *Attorney, Agent, or Firm*—Klaus J. Bach

(57) ABSTRACT

In an exhaust gas turbocharger for an internal combustion engine having a turbine wheel connected, by means of a shaft, to the compressor wheel of a compressor which includes a variable inlet geometry comprising a plunger and a sleeve-shaped partition for controlling an auxiliary duct leading radially to the compressor wheel, which is provided with compressor wheel blades to which air is supplied axially via an axial inlet passage and radially via a radial wheel inlet area, the compressor wheel includes a contoured ring provided at its outer circumferential surface with auxiliary blades disposed over, and aligned with, the compressor wheel blades in the radial and the axial wheel inlet region of the compressor wheel.

10 Claims, 4 Drawing Sheets

U.S. PATENT DOCUMENTS

| | | | |
|---|---|---|---|
| 7,444,814 B2 * | 11/2008 | Sumser | 60/602 |
| 7,506,508 B2 * | 3/2009 | Sumser et al. | 60/605.1 |
| 2007/0154314 A1 * | 7/2007 | Jarrah et al. | 416/203 |

FOREIGN PATENT DOCUMENTS

| | | |
|---|---|---|
| DE | 100 49 198 | 4/2002 |
| DE | 102 23 876 | 12/2003 |
| EP | 205 001 | 12/1986 |
| GB | 499 357 | 7/1938 |

\* cited by examiner

EXHAUST GAS TURBOCHARGER FOR AN INTERNAL COMBUSTION ENGINE

This is a Continuation-In-Part application of pending international patent application PCT/EP2006/003560 filed Apr. 19, 2006 and claiming the priority of German patent application 10 2005 019 938.0 filed Apr. 29, 2005.

BACKGROUND OF THE INVENTION

The invention relates to an exhaust gas turbocharger for an internal combustion engine having a turbine wheel and a compressor wheel mounted on a common shaft, wherein the compressor wheel is disposed in a housing having an inlet with an adjustable inlet structure for controlling the air flow to the compressor wheel.

Such an exhaust gas turbocharger is described in DE 100 49 198 A1. This exhaust gas turbocharger comprises a compressor in the intake tract of an internal combustion engine, which compressor is driven via a shaft by a turbine disposed in the exhaust tract. In the turbine, the energy of the exhaust gas is converted into a rotary movement of the turbine wheel. The turbine wheel of the turbine is rotationally fixedly connected by means of a shaft to a compressor wheel of the compressor. The rotary movement of the turbine wheel is transmitted via the shaft to the compressor wheel. By rotation of the compressor wheel, the compressor sucks in intake air and compresses it to a higher charge pressure, under which the intake air is supplied to the cylinders of the internal combustion engine.

In order to avoid, or keep as low as possible, a speed drop of the exhaust gas turbocharger, particularly at low loads and speeds of the internal combustion engine, the compressor of the internal combustion engine can also be operated in the so-called cold-air turbine mode in which a pressure gradient across the compressor is utilized for additionally driving the compressor wheel. In order to improve efficiency, an additional duct is provided in the compressor housing, which additional duct extends approximately parallel to the compressor inlet duct and opens out radially into the compressor inlet duct at the level of the compressor wheel blades. Said additional duct is opened at low loads and speeds, so that the intake air impinges radially on the compressor wheel blades and imparts an additional driving impulse thereto.

It is the object of the present invention to provide an exhaust gas turbocharger whose speed can be kept at a minimum level even during a low load and/or speed mode of operation of the internal combustion engine, in particular in the cold-air turbine mode.

SUMMARY OF THE INVENTION

In an exhaust gas turbocharger for an internal combustion engine having a turbine wheel connected, by means of a shaft, to the compressor wheel of a compressor which includes a variable inlet geometry comprising a plunger and a sleeve-shaped partition for controlling an auxiliary duct leading radially to the compressor wheel, which is provided with compressor wheel blades to which air is supplied axially via an axial inlet passage and radially via a radial wheel inlet area, the compressor wheel includes a contoured ring provided at its outer circumferential surface with auxiliary blades disposed over, and aligned with, the compressor wheel blades in the radial and the axial wheel inlet region of the compressor wheel.

The contoured ring is attached to the compressor wheel blades. As a result of the arrangement of the contoured ring, which is provided with auxiliary blades in the wheel inlet region of the compressor wheel, the efficiency of the exhaust gas turbocharger at low speeds and/or low loads of the internal combustion engine can be increased. In addition, the contoured ring with the auxiliary blades increases a mass moment of inertia of the compressor wheel, as a result of which speed fluctuations of the exhaust gas turbocharger can be reduced.

In a further embodiment of the invention, the contoured ring with the auxiliary blades is embodied as a cold-air turbine wheel zone structure with a radial in-flow arrangement. In this way, it is possible in particular in the cold-air turbine mode to obtain an increase in efficiency of the exhaust gas turbocharger.

The auxiliary blades may also be disposed, separated only by the contoured ring, on the compressor wheel blades. The auxiliary blades merge, at an end of the contoured ring which faces toward a compressor wheel outlet of the compressor wheel, into the compressor wheel blades. As a result of the transition of the auxiliary blades into the compressor wheel blades, there is no flow separation of the intake air, which could cause turbulence that would reduce the exhaust gas turbocharger efficiency, either at low speeds and/or low loads of the internal combustion engine, or at medium to high speeds and/or loads of the internal combustion engine, or in the cold-air turbine mode of the exhaust gas turbocharger.

The axial blade contour of the auxiliary blades may be configured such that, proceeding from the end of the contoured ring which faces toward the compressor wheel outlet to a certain apex of the axial blade contour, a first blade angle of the auxiliary blades corresponds to a blade angle of the compressor wheel blades of the compressor wheel, and such that, proceeding from the apex to an end of the contoured ring which faces away from the compressor wheel outlet, the auxiliary blades have a second blade angle which differs from the first blade angle. As a result of the change in the blade angle of the auxiliary blades from a first blade angle into a second blade angle, a hook-shaped blade contour of the auxiliary blades is generated, as a result of which the flow of the intake air is aligned such that the intake air flows almost entirely via the contoured ring and a cold-air turbine wheel outlet into a compressor wheel outlet. The hook-shaped blade contour prevents a flow of the intake air via the end of the contoured ring which faces away from the compressor wheel outlet and into the axial wheel inlet region. In order to avoid an improper approach of the flow to the auxiliary blades, the apex of the blade angle change is situated, with a slight axial deviation, at the level of a characteristic edge of a guide vane structure of a variable compressor geometry.

The second blade angle is between 0° and 45°.

In a longitudinal section through the contoured ring, the outer lateral surface of the contoured ring has a rectilinear form or a curved, concave form or a partially rectilinear and a partially curved form.

The outer diameter or the inner diameter and the outer diameter of the contoured ring increases continuously proceeding from the apex to an end of the contoured ring which faces away from the compressor wheel outlet of the compressor wheel. In this way, the lateral surface of the contoured ring has a curved shape. As a result of said curved shape of the contoured ring, a blade height of the auxiliary blades reduces likewise continuously corresponding to the increase in the outer diameter of the contoured ring. The shape of the contoured ring likewise prevents, like the hook-shaped blade contour of the auxiliary blades, a flow of the intake air via the end of the contoured ring which faces away from the compressor wheel outlet of the compressor wheel and into the axial wheel inlet region of the compressor wheel.

Preferably, the blade height of the auxiliary blades becomes zero at the end of the contoured ring which faces away from the compressor wheel outlet of the compressor wheel.

The outer diameter or the inner diameter and the outer diameter of the contoured ring increases continuously proceeding from the apex to an end of the contoured ring which faces toward the compressor wheel outlet of the compressor wheel. In this way, the lateral surface of the contoured ring likewise has a curved shape. As a result of said curved shape of the contoured ring, the blade height of the auxiliary blades reduces likewise continuously corresponding to the increase in the outer diameter of the contoured ring. The shape of the contoured ring promotes a direct flow of the intake air into the compressor wheel outlet and prevents the flow of the intake air via the end of the contoured ring which faces away from the compressor wheel outlet of the compressor wheel and into the axial wheel inlet region of the compressor wheel.

Additional blades may be arranged between the auxiliary blades on the contoured ring. As a result of the provision of additional blades, the efficiency of the exhaust gas turbocharger in the cold-air turbine mode can be further increased. In addition, the additional blades increase the mass moment of inertia of the compressor wheel, so that speed fluctuations of the exhaust gas turbocharger can be further reduced.

The number of auxiliary blades corresponds to the number of compressor wheel blades.

The invention will become more readily apparent from the following description thereof on the basis of accompanying drawings.

DESCRIPTION OF PARTICULAR EMBODIMENTS

In the following figures, identical or equivalent components are provided with the same reference symbols.

Figure 1:
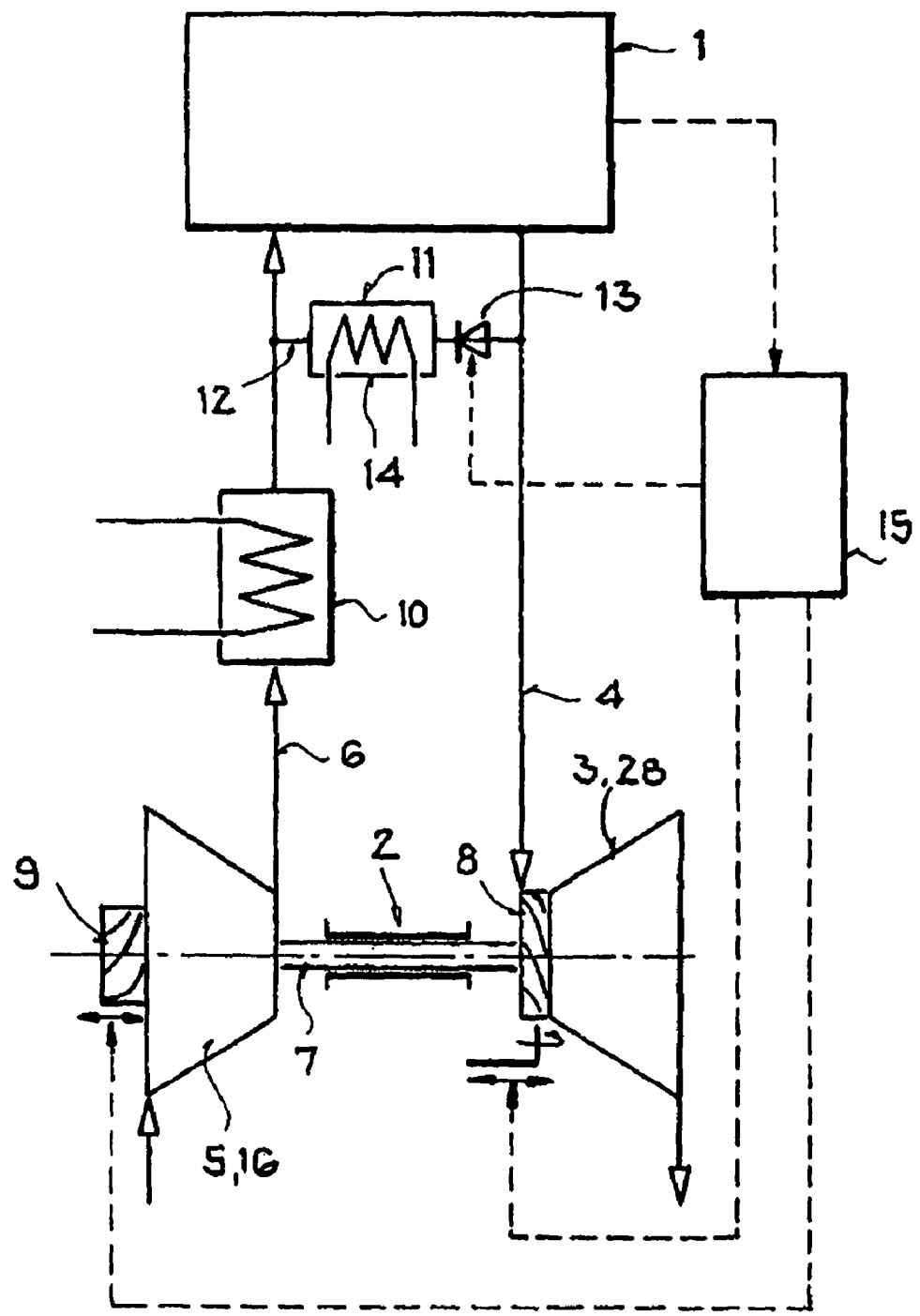
FIG. 1 is a schematic illustration of an internal combustion engine having an exhaust gas turbocharger according to the invention.

The internal combustion engine 1 illustrated in FIG. 1, a spark-ignition engine or a diesel engine, is provided with an exhaust gas turbocharger 2 which comprises a turbine 3 in an exhaust tract 4 of the internal combustion engine 1 and a compressor 5 in an intake tract 6 of the internal combustion engine 1. A turbine wheel 28 of the turbine 3 is rotationally fixedly connected by means of a shaft 7 to a compressor wheel 16 of the compressor 5. The turbine 3 is provided with a variable turbine geometry 8 for the variable adjustment of the effective turbine inlet cross section between a minimal, blocking position and a maximum open position. The compressor 5 is provided with a variable compressor geometry 9 for the variable adjustment of the effective compressor inlet cross section between a minimal and a maximum open position.

In operation of the internal combustion engine 1, the turbine wheel 28 of the turbine 3 is driven by the pressurized exhaust gases of the internal combustion engine 1. The rotary movement of the turbine wheel 28 is transmitted via the shaft 7 to the compressor wheel 16 of the compressor 5, whereby intake air at ambient pressure is sucked in and compressed to an increased pressure. A charge-air cooler 10 is situated in the intake tract 6 downstream of the compressor 5, in which charge-air cooler 10 the compressed air is cooled. The air is subsequently supplied under charge pressure to cylinders (not illustrated in any more detail) of the internal combustion engine 1.

The internal combustion engine 1 is additionally assigned an exhaust gas recirculation device 11 which comprises an exhaust gas recirculation line 12 which branches off from the exhaust tract 4 upstream of the turbine 3 and opens out into the intake tract 6 downstream of the charge-air cooler 10. Situated in the exhaust gas recirculation line 12 are an adjustable check valve 13 and an exhaust gas cooler 14.

All the assemblies of the internal combustion engine 1 are adjusted, as a function of state and operating variables of the internal combustion engine 1 and of the assemblies themselves, by actuating signals of a regulating and control unit 15. This relates in particular to the variable turbine geometry 8, the variable compressor geometry 9 and the check valve 13 in the exhaust gas recirculation line 12.

Figure 2:
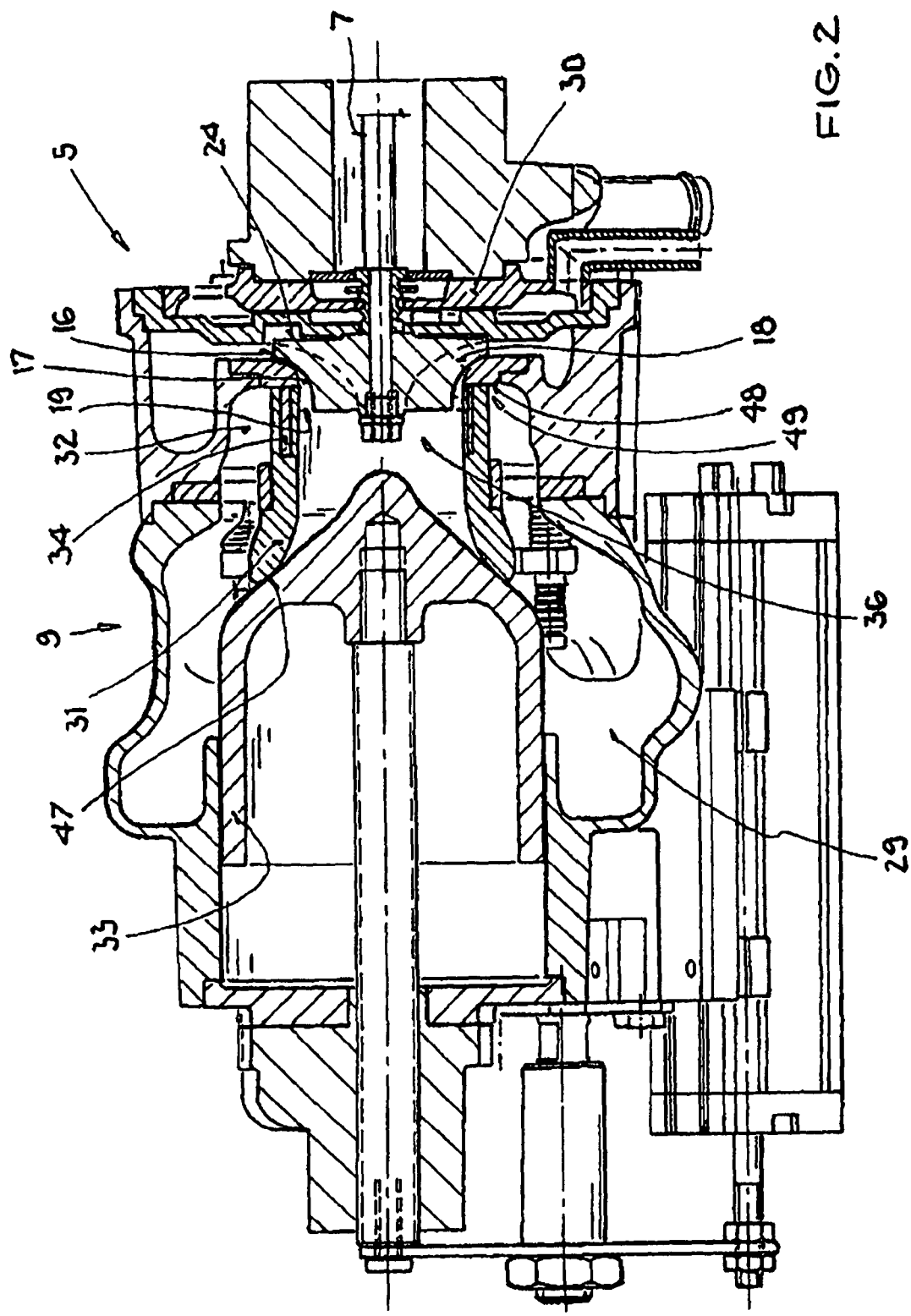
FIG. 2 shows a section through a compressor, with variable compressor inlet geometry, of the exhaust gas turbocharger according to the invention, in the operating mode of the compressor as a cold-air turbine.

FIG. 2 shows a position of the variable compressor geometry 9 of the compressor 5 in which the compressor 5 is operated in a cold-air turbine mode. The variable compressor geometry 9 is present in the form of a sleeve-like partition 31, a plunger 33 and a guide vane structure 34. The compressor wheel 16 is rotatably mounted in a compressor housing 30. The compressor wheel 16 is driven by the shaft 7. The compressor housing 30 has a compressor inlet duct 29 in which the sleeve-shaped, axially moveable partition 31 is arranged, which partition 31 separates an annular additional duct 32 from the compressor inlet duct 29. An end side 47, which faces away from the compressor wheel 16, of the sleeve-like partition 31 is acted on by the plunger 33, as a result of which the sleeve-like partition 31 is pressed in the direction of a housing wall section 48 which is adjacent to the compressor wheel 16. The sleeve-like partition 31 is biased in the opposite direction by a spring element (not illustrated), so that, when the plunger 33 is retracted, an opening 49 of the additional duct 32 into a radial wheel inlet region 19 of the compressor wheel 16, which is shown closed in FIG. 2, is opened. This opening 49 is situated axially at the level of the compressor wheel blades 18.

The annular guide vane structure 34 is arranged in the additional duct 32 close to the compressor wheel blades 18 in a radial wheel inflow region 19. The intake air, which enters via the opening 49 of the additional duct 32, which is open when the plunger 33 is retracted, and impinges at a high tangential speed against the compressor wheel blades 18, imparts a rotary impulse thereto. This operating mode is carried out in particular in the lower load and/or speed range of the internal combustion engine 1 in which a pressure drop prevails between a compressor inlet and a compressor outlet (not illustrated).

The described operating mode makes it possible to operate the compressor 5 in the so-called cold-air turbine mode. In said cold-air turbine mode, drive power is absorbed via the compressor wheel 16, as a result of which the speed of the exhaust gas turbocharger 2 can be kept at a relatively high minimum level even in operating ranges of the internal combustion engine 1 at low load and/or speed.

With increasing load and/or speed, the plunger 33 which is illustrated in FIG. 2 is retracted to such an extent that a direct flow path past the end edge 47, which is adjacent to the plunger 33, of the sleeve-shaped partition 31 in the direction of an axial wheel inlet region 36 of the compressor wheel 16 is opened. In said position, most of the intake air flows substantially axially to the compressor wheel 16. In this operating range of the compressor, there is no cold-air turbine mode. The intake air is compressed from almost ambient pressure to a charge pressure.

Figure 3A:
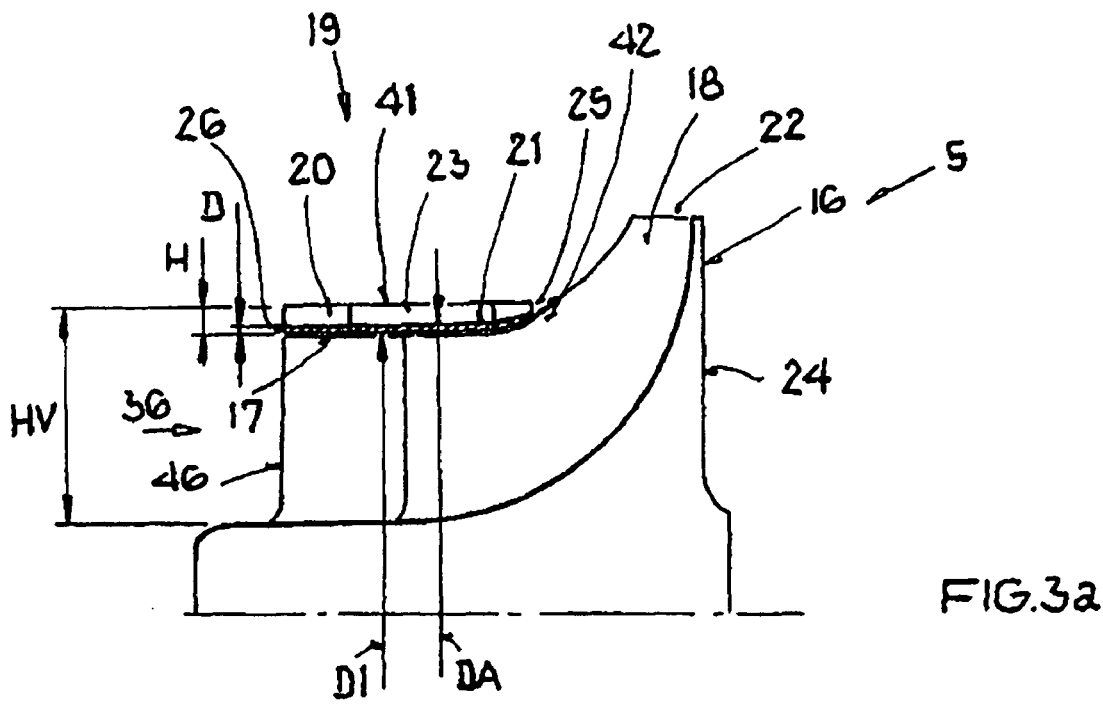
FIG. 3a shows a partial section through a compressor wheel of the compressor of the exhaust gas turbocharger according to the invention, having a contoured ring corresponding to a first exemplary embodiment.

FIG. 3a illustrates a partial section through the compressor wheel 16 of the compressor 5 of the exhaust gas turbocharger according to the invention as per a first exemplary embodiment. The compressor wheel 16 has a contoured ring 17 which extends rectilinearly at an outer lateral surface 21 and has auxiliary blades 20 and additional blades 23. The contoured ring 17 is attached to the compressor wheel 16 at an end 24 of the compressor wheel 16 which faces away from a compressor wheel outlet 22 in such a way that intake air can flow to the contoured ring 17 from the radial wheel inlet region 19 of the compressor wheel 16 and also from its axial wheel inlet region 36.

Here, the contoured ring 17 has a thickness D of 1 mm. The auxiliary blades 20 are attached to a lateral surface 21 of the contoured ring 17. The auxiliary blades 20 have a blade height H. The blade height H of the auxiliary blades 20 is preferably approximately 10% of a blade height HV of the compressor wheel blades 18. The blade height HV corresponds to the height of the compressor wheel blades 18 plus the height of the auxiliary blade 20 at a compressor wheel inlet 46 in the axial wheel inlet region 36.

In certain operating ranges of the internal combustion engine 1 illustrated in FIG. 1, at low load and/or low speed or in the cold-air turbine mode, in which there is a low mass flow through the internal combustion engine 1, that is, a low amount of intake air flow through the compressor 5 and a low exhaust gas mass flows through the turbine 3, the exhaust gas turbocharger 2 is subjected to great rotational speed fluctuations. In said operating ranges, there is a lack of approaching flow of the intake air to the compressor wheel 16. The intake air flows out of the additional duct 32 via the variable compressor geometry 9 into the radial wheel inlet region 19. From the radial wheel inlet region 19, said intake air flows further into a cold-air turbine inlet 41 of the compressor wheel 16. Here, the flow of the intake air can be split, which leads to a part of the intake air flowing into the axial wheel inlet region 36 which is illustrated in FIG. 2, and the other part of the intake air flowing into the compressor wheel outlet 22.

Figure 4:
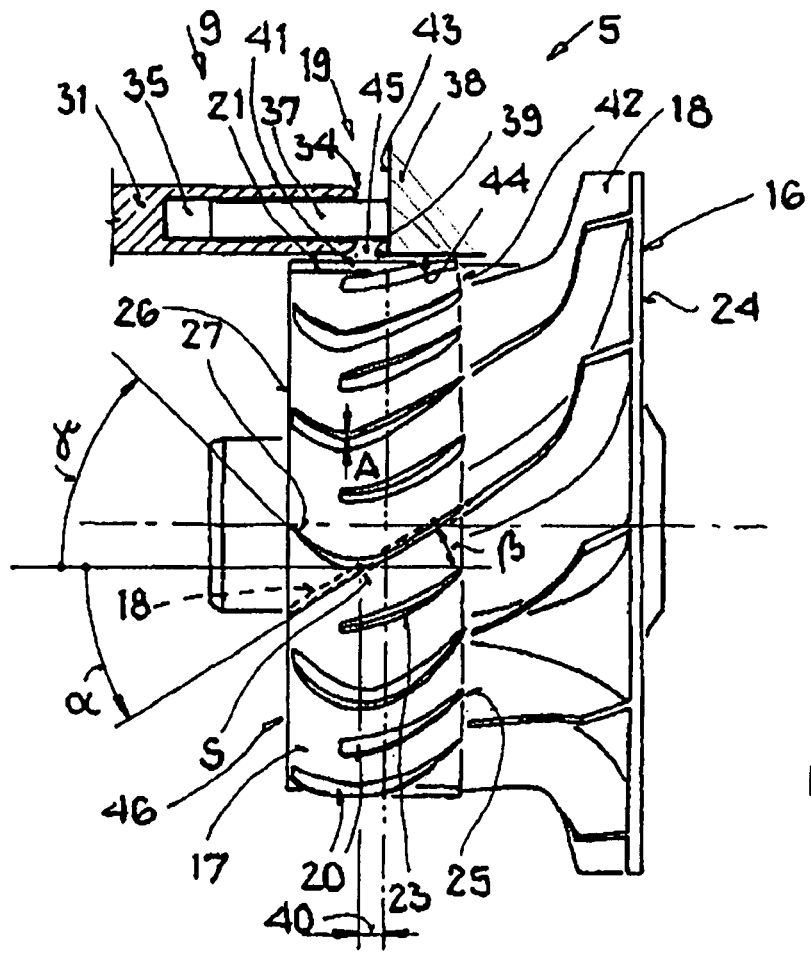
FIG. 4 shows a section through the compressor of the exhaust gas turbocharger with a plan view of the compressor wheel as per FIG. 3a, and FIG. 5 is a three-dimensional illustration of the compressor wheel of the exhaust gas turbocharger, having the contoured ring corresponding to a third exemplary embodiment.

The contoured ring 17 which is illustrated in FIG. 3a and is provided with auxiliary blades 20 leads largely to a flow of the intake air from the radial cold-air turbine inlet 41 to the auxiliary blade ducts 46 which are formed by the auxiliary blades 20 and are illustrated in more detail in FIG. 4. From there, the intake air flows axially via air outlets 42 out of the auxiliary blade passages 46, referred to below as the cold-air turbine outlet 42, directly to the radial compressor wheel outlet 22.

Additional blades 23 are preferably arranged on the contoured ring 17 between the auxiliary blades 20.

The decisive factor for a successful cold-air turbine mode is a pressure gradient between a pressure at the cold-air turbine wheel inlet 41 and the cold-air turbine outlet 42. Said pressure gradient can be increased by means of a reduction of the effective cross section of the cold-air turbine wheel inlet 41. The reduction can on the one hand occur by means of the shape, the thickness and the number of auxiliary blades 20. On the other hand, the arrangement of the additional blades 23 between the auxiliary blades 20 represents a further possibility for reducing the effective cross section of the cold-air turbine wheel inlet 41.

Figure 3B:
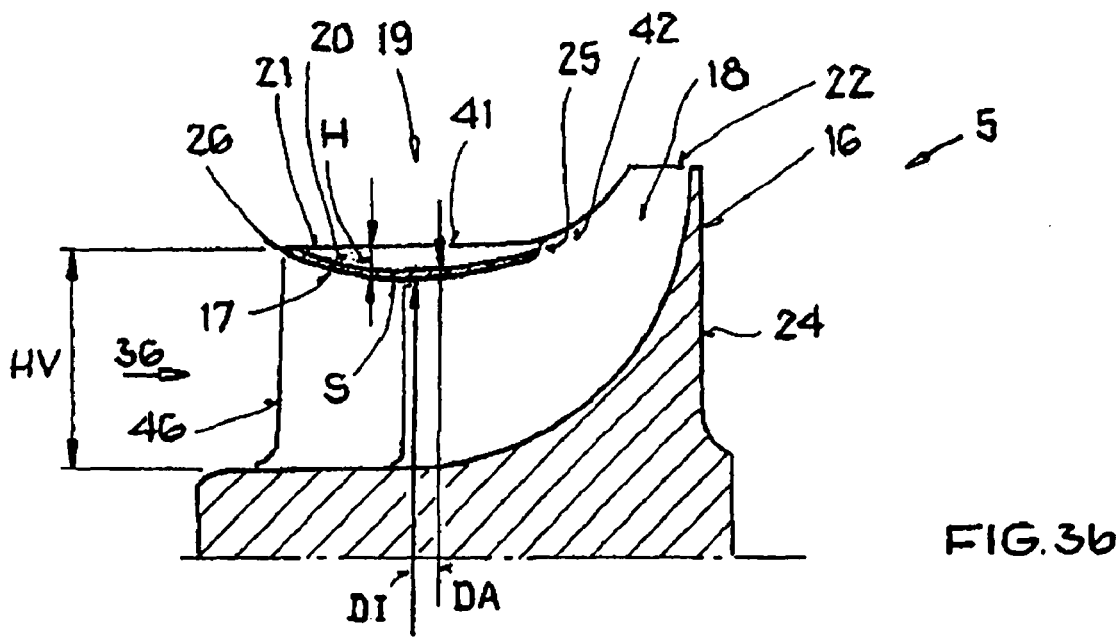
FIG. 3b shows a partial section through the compressor wheel of the compressor of the exhaust gas turbocharger according to the invention, having the contoured ring corresponding to a second exemplary embodiment, with an outer lateral surface of the contoured ring having a curved, concave shape.

FIG. 3b shows a partial section through the compressor wheel 16 of the compressor 5 of the exhaust gas turbocharger according to the invention having the contoured ring 17 according to a second exemplary embodiment. The outer lateral surface 21, which is illustrated as being rectilinear in FIG. 3a, of the contoured ring 17 has an inwardly curved, concave shape in FIG. 3b. An inner diameter DI of the contoured ring 17 and an outer diameter DA of the contoured ring 17 increase continuously proceeding from an apex S respectively to an end 25 of the contoured ring 17 which faces toward the compressor wheel outlet 22 of the compressor wheel 16 and to an end 26 of the contoured ring 17 which faces away from the compressor wheel outlet 22 of the compressor wheel 16. A determination of the apex S is explained in more detail in the description of FIG. 4. The end 25 of the contoured ring 17 which faces toward the compressor wheel outlet 22 of the compressor wheel 16 is referred to below as the first end 25, and an end 26 of the contoured ring 17 which faces away from the compressor wheel outlet 22 of the compressor wheel 16 is referred to below as the second end 26.

The blade height H of the auxiliary blades 20 becomes to zero at the second end 26 of the contoured ring 17. Said configuration of the contoured ring 17 largely prevents a flow of the intake air past the second end 26 of the contoured ring 17 into the axial wheel inlet region 36, and there is a resulting flow of the intake air via the contoured ring 17 and the cold-air turbine outlet 42 directly toward the compressor wheel outlet 22. A small part of the flow can, as before, flow via the contoured ring 17 into the axial wheel inlet region 36.

FIG. 4 shows a section through the compressor 5 of the exhaust gas turbocharger 2 according to the invention, with a plan view of the compressor wheel 16 corresponding to FIG. 3a. The compressor 5 has the variable compressor geometry 9. The variable compressor geometry 9 is present in the form of the sleeve-shaped partition 31 in connection with the plunger 33 and the guide vane structure 34, with the sleeve-shaped partition 31 being movable axially by the plunger 33. Guide vanes 37 of the guide vane structure 34 are arranged in an opening 35 of the sleeve-shaped partition 31. A thick-walled ring 38 which supports the guide vanes 37 has a characteristic edge 39 which is required for the construction the auxiliary blades 20. Said characteristic edge 39 is an edge of intersection of a face 43 of the ring 38 which faces toward the guide vanes 37, and a face 44 of the ring 38 which faces the contoured ring 17. The area 38 is part of the compressor housing 30 or is firmly connected thereto.

An axial blade contour 27 of the auxiliary blades 20 is designed such that, proceeding from the first end 25 of the contoured ring 17 to the apex S, a first blade angle β of the auxiliary blades 20 corresponds to a blade angle α of the compressor wheel blades 18.

Proceeding from the apex S to the second end 26 of the contoured ring 17, the auxiliary blades 20 have a second blade angle γ which differs from the first blade angle β. The second blade angle γ is preferably between 0° and 45°. The second blade angle γ is oriented such that, at blade angles which are greater than 0°, it is always oriented counter to the blade angle α, that is to say the second blade angle γ is always oriented counter to a rotational direction of the compressor wheel 16.

The apex S is selected so as to have a certain axial spacing 40 to the characteristic edge 39. This configuration of the axial blade contour 27 largely prevents an incorrect inflow onto the auxiliary blades 20. The size of the spacing 40 is dependent on the operating points in the compressor mode of operation.

The auxiliary blades 20 are disposed, separated only by the contoured ring 17, over the compressor wheel blades 18 and merge, at the first end 25 of the contoured ring 17 into the compressor wheel blades 18. The compressor wheel 16 and the contoured ring 17 with the auxiliary blades 20 can be designed as a single-part component or as a multi-part component. It is likewise possible for the compressor wheel 16 and the contoured ring 17 with the auxiliary blades 20 and the additional blades 23 to be designed as a single-part component or as a multi-part component.

As a result of the transition of the auxiliary blades 20 into the compressor wheel blades 18, a flow separation of the intake air on its path from the radial wheel inlet region 19 via the contoured ring 17 to the compressor wheel outlet 22 can be prevented. A flow separation would reduce the efficiency of the exhaust gas turbocharger 2 illustrated in FIG. 1. In order to avoid further efficiency-reducing flow disturbances, each compressor wheel blade 18 is assigned an auxiliary blade 20.

The additional blades 23 which are arranged between the auxiliary blades 20 on the contoured ring 17 have a shorter axial extent than the auxiliary blades 20. The radial wheel inlet region 19 can be closed off or opened to a greater or lesser degree by means of a corresponding movement of the sleeve-shaped partition 31.

In operating ranges of the internal combustion engine 1 in which particularly small mass flows are present, the radial wheel inlet region 19, which is illustrated in FIG. 4, is greatly reduced in size by means of the variable compressor geometry 9. Here, the sleeve-shaped partition 31 is moved in the direction of the ring 38 until a corresponding gap is formed between the sleeve-shaped partition 31 and the ring 38. In order that the pressure-increasing reduction of the effective cross section of the cold-air turbine wheel inlet 41 is successful in a selected operating range which determines the gap 45 between the sleeve-shaped partition 31 and the ring 38, the additional blades 23 have a shorter axial extent than the auxiliary blades 20. In said exemplary embodiment, the additional blades 23 extend approximately from the apex S of the auxiliary blades 20 to the first end 25 of the contoured ring 17.

When the radial wheel inlet region 19 to the second end 26 of the contoured ring 17 is opened, that is to say when the sleeve-shaped partition 31 is moved to such an extent that the radial wheel inlet region 19 to the second end 26 of the contoured ring 17 is opened, the flow approaches the contoured ring 17 with a radial component. The intake air flows entirely via the contoured ring 17 with the auxiliary blades 20 and on into the compressor wheel outlet 22.

A further movement of the sleeve-like partition 31 or a further opening of the radial wheel inlet region 19 results, in addition to the radial inflow, in an axial inflow to the compressor wheel 16. As a result, only a part of the intake air flows via the contoured ring 17 between the auxiliary blades 20 to the compressor wheel outlet 22. The other part of the intake air flows conventionally through the contoured ring 17 to the compressor wheel 16 and along the compressor wheel blades 18 to the compressor wheel outlet 22.

Figure 5:
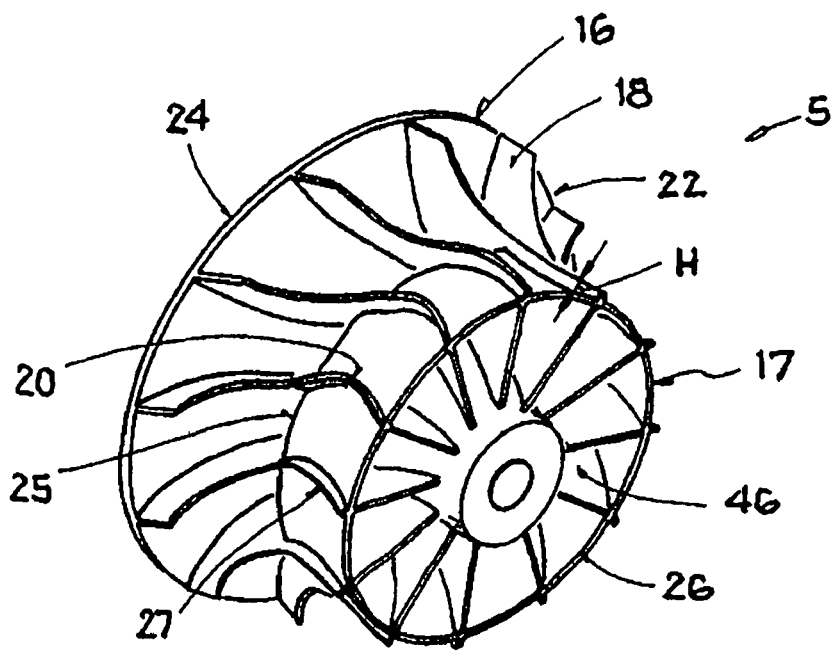

For better understanding, FIG. 5 depicts a three-dimensional illustration of the compressor wheel 16 with the contoured ring 17, which has auxiliary blades 20, corresponding to a third exemplary embodiment. The outer lateral surface 21 of the contoured ring 17 has a rectilinear shape. Only the auxiliary blades 20 are shown arranged on the contoured ring 17.

The contoured ring 17 with the auxiliary blades 20 can also be used, in the operation of the compressor 5, to change a pumping limit. The pumping limit extends, in a compressor characteristic map, from a range of small mass flows at small exhaust gas turbocharger speeds to large mass flows at high exhaust gas turbocharger speeds. Said pumping limit divides the range of the compressor 5 in which the compressor 5 reliably sucks in and compresses air, from the range of the compressor 5 in which the compressor no longer operates in a reliably effective manner. The pumping limit of the compressor 5 should not be exceeded in operation. In the case of excessively small air mass flows, the flow separates from the compressor wheel blades 18 of the compressor 5. The delivery process therefore becomes unstable. The air flows backwards through the compressor 5 until a stable pressure ratio is generated. The pressure builds up once again. The process repeats in rapid succession. This generates noise, so-called pumping noise.

In the range of compressor operation at very low mass flow rates and/or low speeds of the exhaust gas turbocharger 2, which is illustrated in FIG. 1, close to the pumping limit, the auxiliary blades 20 which are illustrated in FIG. 4 can be used effectively as turbulence generators. This results in a movement of the pumping limit to lower mass flow rates.

A perforation of that end of the contoured ring 17 which faces away from the compressor wheel outlet 22, between the auxiliary blades 20, can also bring about a movement of the pumping limit to relatively low mass flows. As a result of the connection of the region which is situated below the contoured ring 17 to the region which is situated above the lateral surface of the contoured ring 17 on account of the perforation, a circulation of the intake air which is situated there is generated, which circulation can bring about a movement of the pumping limit.

The contoured ring 17 results in increases in compressor efficiency, on account of its effect of influencing flow direction, specifically in charged operating ranges with high throughputs and/or high speeds of the internal combustion engine 1.

What is claimed is:

1. An exhaust gas turbocharger for an internal combustion engine, including a turbine (3) with a turbine wheel (28), a compressor (5) with a compressor wheel (16) rotationally fixedly connected by means of a shaft (7) to the turbine wheel (28), the compressor (5) having a variable compressor inlet geometry comprising a plunger (33) and a sleeve-like partition (31) movably supported so as to partially or completely open or close an auxiliary duct (29) extending radially to the compressor wheel (16), the compressor wheel (16) having compressor wheel blades (18) with an axial inlet area (36) and a radial wheel inlet area (19) for receiving air from the auxiliary duct (29), said compressor wheel (16) including a contoured ring (17) provided at its outer surface with auxiliary blades (20) so as to be arranged over the compressor wheel blades (18) the contoured ring (17) extending axially over at least a part of the radial and of the axial wheel inlet areas (19, 36) of the compressor wheel (16), the auxiliary blades (20)

being attached to an outer lateral surface (21) of the contoured ring (17) so as to merge at their downstream ends with the compressor wheel blades (18), and, in a longitudinal section through the contoured ring (17), the outer lateral surface (21) of the contoured ring (17) having one of a rectilinear form, a curved, concave form and a partially rectilinear and a partially curved form.

2. The exhaust gas turbocharger as claimed in claim 1, wherein the contoured ring (17) with the auxiliary blades (20) is embodied as a cold-air turbine wheel blade structure to which air is supplied in a radial flow pattern.

3. The exhaust gas turbocharger as claimed in claim 1, wherein the auxiliary blades (20) are disposed, separated only by the contoured ring (17), on the compressor wheel blades (18) and merge, at an end (25) of the contoured ring (17) which faces toward a compressor wheel outlet (22) of the compressor wheel (16), with the compressor wheel blades (18).

4. The exhaust gas turbocharger as claimed in claim 1, wherein the auxiliary blades (20) are configured to have a contour (27) wherein the auxiliary blades (20) are curved in axial direction such that, proceeding from an end (25) of the contoured ring (17) near the compressor wheel outlet (22) of the axial blade contour (27), a first blade angle ($\beta$) of the auxiliary blades (20) corresponds to a blade angle ($\alpha$) of the compressor wheel blades (18), and, at the inlet end (26) of the contoured ring (17) opposite the compressor wheel outlet (22), the auxiliary blades (20) have a second blade angle ($\gamma$) which differs from the first blade angle ($\beta$) the blade angles being angles with respect to the axial direction of the compressor wheel.

5. The exhaust gas turbocharger as claimed in claim 4, wherein the second blade angle ($\gamma$) is between 0° and 45°.

6. The exhaust gas turbocharger as claimed in claim 1, wherein the auxiliary blades (20) have a height (H) over the contoured ring (17) which depends on the outer diameter (DA) of the contoured ring (17) and which decreases proceeding from an apex (S) in the direction of the end (26) of the contoured ring (17) which faces away from a compressor wheel outlet (22) of the compressor wheel (16).

7. The exhaust gas turbocharger as claimed in claim 6, wherein the height (H) of the auxiliary blades (20) decreases to zero as a function of the increase in the outer diameter (DA) of the contoured ring (17) proceeding from the apex (S) in the direction of the end (26) of the contoured ring (17) which faces away from the compressor wheel outlet (22) of the compressor wheel (16).

8. The exhaust gas turbocharger as claimed in claim 6, wherein the height (H) of the auxiliary blades (20) decreases as a function of an increase in an outer diameter (DA) of the contoured ring (17) proceeding from the apex (S) in the direction of an end (25) of the contoured ring (17) which faces toward a wheel outlet (22) of the compressor wheel (16).

9. The exhaust gas turbocharger as claimed in claim 1, wherein the contoured ring (17) has additional blades (23) arranged between the auxiliary blades (20).

10. The exhaust gas turbocharger as claimed in claim 1, wherein the number of auxiliary blades (20) corresponds to the number of compressor wheel blades (18).

* * * * *